Figure 1:
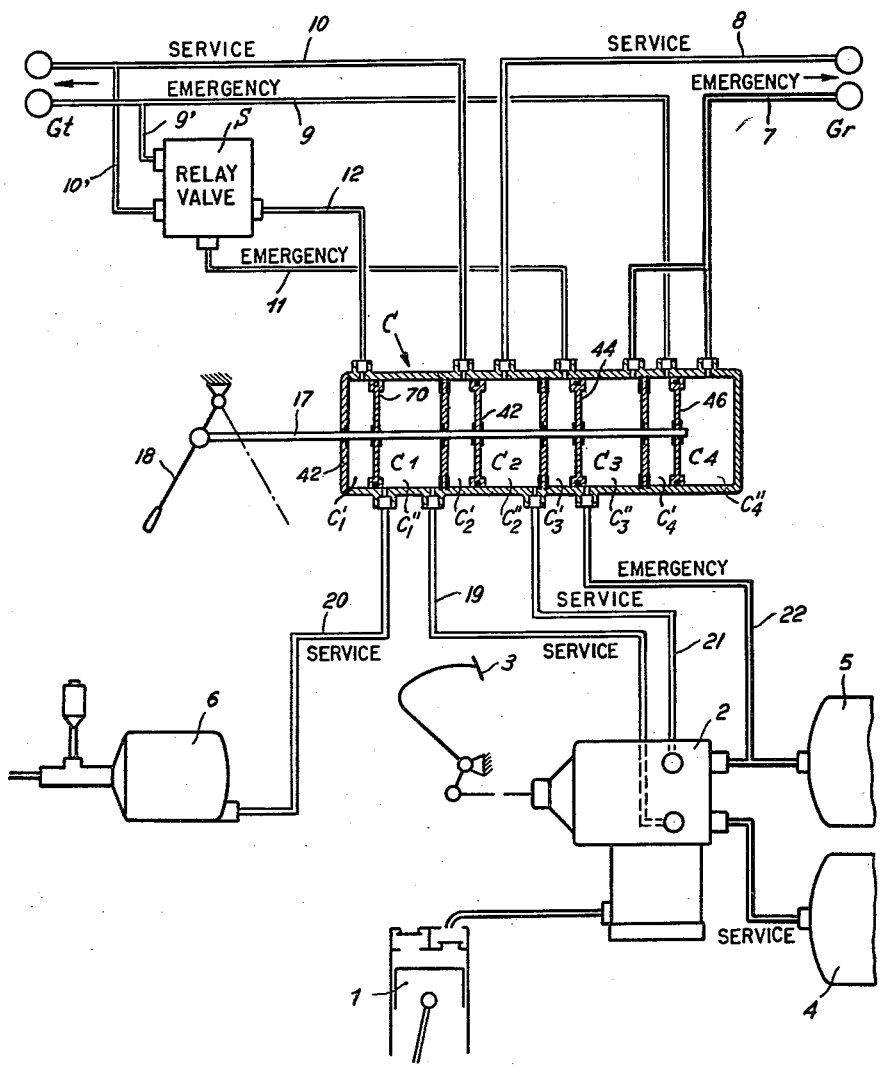

June 25, 1963  G. ALFIERI  3,095,245
BRAKING PLANT FOR A TOWABLE VEHICLE
Filed May 12, 1960  2 Sheets-Sheet 2

INVENTOR.
G. Alfieri
BY Richards & Geier
ATTORNEYS

United States Patent Office 3,095,245
Patented June 25, 1963

3,095,245
BRAKING PLANT FOR A TOWABLE VEHICLE
Giuseppe Alfieri, Milan, Italy, assignor to Fabbrica Italiana Magneti Marelli S.p.A., Milan, Italy, a firm
Filed May 12, 1960, Ser. No. 28,591
Claims priority, application Italy June 12, 1959
5 Claims. (Cl. 303—14)

The present invention deals with a pneumatic braking installation for a towable vehicle, with or without a trailer, and of the type essentially comprising an air compressor, a distributor, a pneumatic hydraulic converter, air reservoir tank for the motor vehicle unit, a like tank for the trailer section, and lastly connected-up couplings for the trailer.

In the case of breakdowns, for example in the motor vehicle section, this latter cannot proceed on its journey if the repair cannot be made on the spot, and it is necessary to tow it by means of an auxiliary tractor. The towing operation is both difficult and dangerous, particularly if the broken-down vehicle has a trailer coupled to it, in which event there is a procession of three vehicles on the road.

In military operations this situation can frequently arise, in areas where rapid and completely independent movement is absolutely necessary.

For this reason, pneumatic installations have been created, and are commonly known, which permit the operation of the brakes of the vehicle and eventually of the relative trailer, whether under normal independent travelling conditions of the vehicle or under towing conditions.

During normal travelling conditions, the brakes are applied by the driver, who when pressing on the foot pedal, activates, by means of the distributor, the normal braking system of the vehicle and any eventual trailer coupled to the vehicle.

According to familiar usage, the operation of the brakes in both the aforementioned travelling conditions is normally achieved through the employment of cut-off cocks and two-way valves. Double check valves are also employed which permit feeding of the operating elements by means of two different sources; that of the motor vehicle unit in one case, and that of the auxiliary tractor in the second case, operating in such a manner as to connect one source with the operating elements, and at the same time excluding the other source under the action of the air flow which determines the unbalancing of the pneumatic action.

The defects of these traditional installations are also common knowledge, and are essentially due to the fact that in order to pass from one speed to another it is necessary, each time, to operate the valves manually several times; over and above this, uncertainty exists regarding the automatic functioning of the double check valves, the intervention of which is not always absolutely certain, especially in the case of moderated braking operations at low pressure.

The object of the present invention is to eliminate the above mentioned defects with the adoption of a new and secure installation, in which the manually-operated valves and the double check valves are both eliminated.

The invention is characterised by the fact that the distributing plant is completed with a double heading valve, and an emergency relay valve connected in such a manner that feeding of the motor vehicle brake units, and eventually that of the trailer during the independent travelling conditions of the vehicle, is effected by the operation of the motor vehicle distributor by means of the double heading valve located in one position, while on the other hand, feeding of these same elements during towing operation is effected by the auxiliary tractor distributor by means of the emergency relay valve and the double heading valve disposed in the other position.

With the use of the invention herein described, securely sealed sectioning of the pneumatic circuit is achieved, and the changeover from independent travel to towed travel is effected by one simple movement of the double heading valve control.

During independent travel (normal travel), the double heading valve excludes the emergency relay valve and the coupling connections from the pneumatic circuit, and on the other hand, by means of the motor vehicle distributor, permits feeding of the service control line of the double heading valve, and also the feeding of the trailer emergency line by means of the trailer air reservoir tank.

Under towing conditions, the double heading valve, which is moved into a position opposed to that during independent travelling conditions, excludes the motor vehicle distributor from the pneumatic circuit, and permits feeding of the converter and feeding of the trailer air tank, and of the emergency relay valve connected to the pneumatic circuit of the tractor, and further the feeding of the service control line, and trailer emergency line of the corresponding service control and emergency lines of the tractor. In this manner the three vehicle units operate exactly as a motor vehicle with two trailers having continuous automatic braking, in such a manner that the service braking of the convoy is determined by the auxiliary tractor driver, while in the event of uncoupling, emergency braking can take place both on the motor vehicle or on the trailer coupled to same.

The further particulars and features will be illustrated and described with reference to the attached drawings, which represent, only by way of example, the layout of a duplex distributor installation conforming to the present invention.

Figure 2:
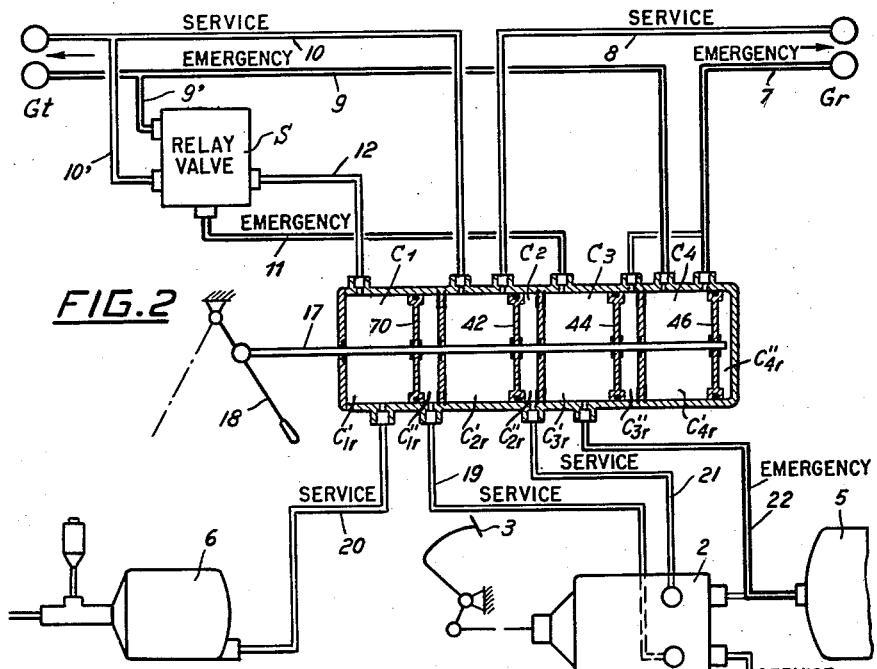
Figure 3:
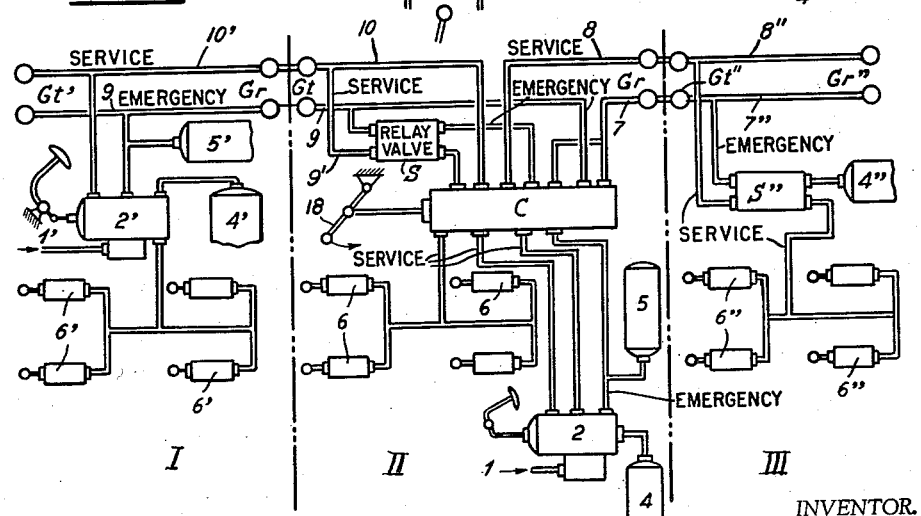

FIGURE 1 shows the installation in normal independent traveling conditions, FIGURE 2 shows the installation under towing conditions and FIGURE 3 is a diagram showing the system of three vehicles forming the convoy.

Referring to the drawings, 1 indicates the installation compressor, 2 the compressed air tractor valve controlled by brake pedal 3, while 4 and 5 respectively represent the motor vehicle section compressed air reservoir tank, and the trailer reservoir tank, and 6 the pneumatic hydraulic converter connected to the braking sections of the motor vehicle; 7 and 8 respectively represent the emergency line and the service control line directed towards the trailer while Gr represents the connecting couplings.

A characteristic of an emergency line is to be constantly under pressure as opposed to the service control line, which is put under pressure only during the braking phase, that is to say during the operation of the compressed air distributor.

In accordance with the invention, the abovementioned distributing installation is provided with a double heading valve C, an emergency relay valve S, and coupling joints Gt for the auxiliary tractor.

By means of the aforesaid coupling connections, the emergency and service control lines of the tractor are coupled during towing operations with the corresponding emergency and service control lines 9 and 10 of the motor vehicle unit and 9' and 10' of the emergency relay valve connected in turn to the double heading valve by means of the emergency and service control lines 11 and 12. The double heading valve C is comprised of 4 chambers $C_1$, $C_2$, $C_3$ and $C_4$ each being divided into two compartments by a corresponding piston 70, 42, 44, 46, which can slide airtightly.

A rod 17, controlled by a lever 18 having two operating positions, namely, independent travel and towing positions, permits the simultaneous displacement of said pistons from one side to the other in each chamber.

In FIGURE 1 the lever 18 is moved to independent travel position and consequently all the pistons are moved over to the same side. In this position, the condition of double heading valve C corresponds to the independent travel conditions of the vehicle, and no pneumatic coupling is established between the emergency and service control lines 9 and 10 or 9' and 10' and the corresponding lines of the tractor.

By means of the double heading valve, the following connections are effected:

Chamber $C_1$.—One compartment $C'_1$ communicates with the service control line 12 connected to the emergency relay valve S, while the other compartment $C''_1$ puts the tractor service line 19 connected to tractor valve 2 in communication with the tractor service line 20 directed towards the pneumatic hydraulic converter 6.

Chamber $C_2$.—One compartment $C'_2$ communicates with the service control line 10 while the other compartment $C''_2$ puts service line 21 connected to tractor valve 2 in communication with the service control line 8 directed towards the trailer.

Chamber $C_3$.—One compartment $C'_3$ communicates with emergency line 11 connected to the emergency relay valve S while the other compartment $C''_3$ puts the emergency line 22 of the trailer section in contact with the corresponding emergency line 7 directed towards the trailer.

Chamber $C_4$.—One compartment $C'_4$ communicates with emergency line 9, while the other compartment $C''_4$ is connected to the emergency line 7. In this condition compartments $C''_3$ and $C''_4$ are subjected to pressure, while in the brake releasing phase caused by the action of tractor valve 2, compartments $C''_1$ and $C''_2$ will also be put under pressure. The service control lines and emergency lines involved in said phase are shown on the drawing (FIGURE 1) in thickened lines. The following are not affected during the above operational phase: the remaining conduits, the compartments $C'_1$, $C'_2$, $C'_3$ and $C'_4$ and the emergency relay valve S.

In FIGURE 2, the lever 18 is moved to towing position and the condition of the double heading valve C corresponds to the towing conditions of the vehicle. The following connections are therefore established:

Chamber $C_1$.—One compartment $C'_{1r}$ puts service control line 12 connected to the emergency relay valve S in communication with tractor service line 20 directed towards the converter 6, while the other compartment $C''_{1r}$ communicates with tractor service line 19 of tractor valve 2.

Chamber $C_2$.—One compartment $C'_{2r}$ puts the service control line 10 connected to the tractor by means of coupling Gt in communication with the corresponding service control line 8 directed towards the trailer, while the other compartment $C''_{2r}$ communicates with trailer service line 21 deriving from the distributor.

Chamber $C_3$.—One compartment $C'_{3r}$ puts the emergency line 11 connected to the emergency relay valve S in communication with the emergency line 22 of the trailer section air reservoir tank 5, while the other compartment $C''_{3r}$ communicates with the emergency line 7.

Chamber $C_4$.—One compartment $C'_{4r}$ the emergency line 9 connected to the tractor through coupling Gt in communication with the corresponding emergency line 7 directed towards the trailer, while the other compartment $C''_{4r}$ constitutes a closed chamber.

In this condition, compartments $C'_{3r}$ and $C'_{4r}$ (and $C''_{3r}$) are under pressure, while in the braking phase created by the action of the tractor distributor, compartments $C'_{1r}$ and $C'_{2r}$ will also be under pressure.

The lines for compartments $C''_{1r}$, $C''_{2r}$ (and $C''_{4r}$), whether in the braking phase or brake release phase, do not enter into pressure inasmuch as tractor valve 2 in the position of towed travel is excluded from the installation pneumatic circuit.

In FIGURE 3 which illustrates diagrammatically a system of three vehicles forming the convoy, the active tractor I tows the other two vehicles II and III. The braking system of vehicle I is of conventional type and includes a distributor 2' for compressed air from a compressor (not shown) which supplies two reservoirs 4' and 5' for the braking elements of the vehicle I and the braking system of the trailers II and III which in this case is inactive. The distributor 2' which controls the brake actuating members 6', also controls the control line 10' and the emergency relay valves S of the vehicle II whose braking system is inactive. When the emergency relay valve S is actuated it will actuate the brake actuating members 6 of the vehicle II and will also cause the brake actuating members 6'', of the trailer III to be actuated through the control line 8 and the emergency relay valve S'', of the trailer III. Thus the brake actuating members 6, 6' and 6'' will be all controlled by the distributor 2' of the vehicle I. Moreover, in that case the compressor 1' will provide for the filling of reservoirs 4 and 5 of the damaged vehicle II and of the reservoir 4'' of trailer III through the emergency lines 9, 7 and 7'' of the three vehicles, when the valve C has been actuated and moved into the position shown in FIG. 2.

I claim:

1. A pneumatic braking system for a self propelled motor vehicle connected to a trailer vehicle and adapted to be towed by a third vehicle, comprising air-operated brake-actuating means carried by the self propelled motor vehicle, air-operated brake-actuating means carried by the trailer vehicle, a compressed air reservoir tank for the self propelled motor vehicle, another compressed air reservoir tank for the trailer vehicle, both tanks being carried by said self propelled motor vehicle, compressed air supply means in said third vehicle, selectively operable dual-position control means, a pipe connecting the first-mentioned air-operated brake-actuating means with said dual-position control means, pedal-actuated valve means carried by the self propelled motor vehicle and operatively connected with the two compressed air reservoir tanks, a service control line connected with the second-mentioned air-operated brake actuating means and said dual-position control means, another service control line connected with said compressed air supply means in the third vehicle and said dual-position control means, other service lines connecting said pedal actuated valve means with said dual-position control means, said dual-position control means in its one position being adapted to interconnect one of said other service lines and said pipe, and interconnect a second one of said other service lines and the first-mentioned service control line whereby compressed air may be supplied from said reservoir tanks to the two brake actuating means when the pedal on said pedal actuated valve means is actuated, separate emergency lines connected with said compressed air supply means in the third vehicle and said dual position control and adapted for supplying compressed air for the first mentioned brake actuating means and said second mentioned brake actuating means, said other service control line including a control means for controlling the connection of one of said separate emergency lines with said dual-position control means, a third emergency line connecting said dual-position control means with the second-mentioned brake actuating means, said dual-position control means in its other position being adapted to interconnect the first one of said separate emergency service lines and the first-mentioned pipe, and interconnect a second one of said separate emergency service lines and the third emergency line whereby compressed air may be supplied to said two brake-actuating means.

2. A pneumatic braking system in accordance with claim 1, wherein said dual-position control means comprise a multi-chambered double heading valve, a reciprocable rod within said double heading valve and separate pistons slidable in each chamber of said double heading valve and rigidly connected with said rod, said rod being movable along with said pistons from said one position of the dual-position control means to said other position thereof and vice versa.

3. A pneumatic braking system in accordance with claim 1, wherein the control means comprises an emergency relay valve and other lines connecting said emergency relay valve with said dual-position control means, the second-mentioned service control line and the first and second mentioned emergency lines, said dual-position control means in its second position connecting the third vehicle compressed air reservoir tank through the first-mentioned emergency line and one of the last-mentioned lines to said emergency relay valve and also connecting the first-mentioned brake-actuating means through said pipe and another one of the last-mentioned lines to said emergency relay valve.

4. A pneumatic braking system for a self propelled motor vehicle, connected to a trailer vehicle and adapted to be towed by a third vehicle, comprising an installation compressor, a pedal-controlled compressed air tractor valve connected to said installation compressor, a motor-vehicle compressed-air reservoir tank connected to said tractor valve, a trailer vehicle compressed-air reservoir tank connected to said tractor valve, said tractor valve being adapted to regulate the flow of compressed air from said reservoir tanks, a double heading valve having four chambers, four manually slidable pistons within said chambers and dividing each chamber into separate first and second compartments, said pistons being movable from a travel position to a towing position and vice versa, an emergency relay valve, a pipe connecting said emergency relay valve with the first compartment of the first chamber of the double heading valve, a brake-actuating pneumatic hydraulic converter, a pipe connecting said converter with said first chamber, one of said pistons connecting the last-mentioned pipe with the second compartment of said first chamber in said travel position and with the first compartment of said first chamber in said towing position, a pipe connecting said tractor valve with the second compartment of said first chamber, a service control line adapted to be coupled to said third vehicle and connected with said emergency relay valve and the first compartment of the second chamber of the double heading valve, another service control line connected with said second chamber and adapted to be coupled to said trailer vehicle, another one of said pistons connecting the last-mentioned service control line with the second compartment of said second chamber in said travel position and with the first compartment of said second chamber in said towing position, a pipe connecting said tractor valve with the second compartment of said second chamber, a pipe connecting said emergency relay valve with the first compartment of the third chamber of the double heading valve, a pipe connecting said trailer vehicle compressed-air reservoir tank with said third chamber, a third one of said pistons connecting the last-mentioned pipe with the second compartment of said third chamber in said travel position and with the first compartment of said third chamber in said towing position, an emergency line connected to the second compartment of said third chamber and adapted to be coupled to said trailer vehicle, another emergency line connected to the first compartment of the fourth chamber of the double heading valve and adapted to be coupled to said third vehicle, the first-mentioned emergency line being also connected to said fourth chamber, a fourth one of said pistons connecting the first-mentioned emergency line with the second compartment of said fourth chamber in said travel position and with the first compartment of said fourth chamber in said towing position.

5. A pneumatic braking system in accordance with claim 4, wherein said double heading valve comprises a rod firmly connected with said pistons for sliding said pistons, and a manually operable lever connected with said rod and located in said self propelled motor vehicle for the manual sliding of said pistons.

References Cited in the file of this patent

UNITED STATES PATENTS

| | | |
|---|---|---|
| 1,255,253 | Webster | Feb. 5, 1918 |
| 2,445,456 | Rockwell | July 20, 1948 |